J. H. ANDERSON.
PUSH HAY RAKE.
APPLICATION FILED APR. 12, 1910.

1,063,938.

Patented June 3, 1913.

3 SHEETS—SHEET 1.

Witnesses:
Paul S. Smith
Jule Donovan.

Inventor:
John H. Anderson,
by F. G. Bradbury
Attorney.

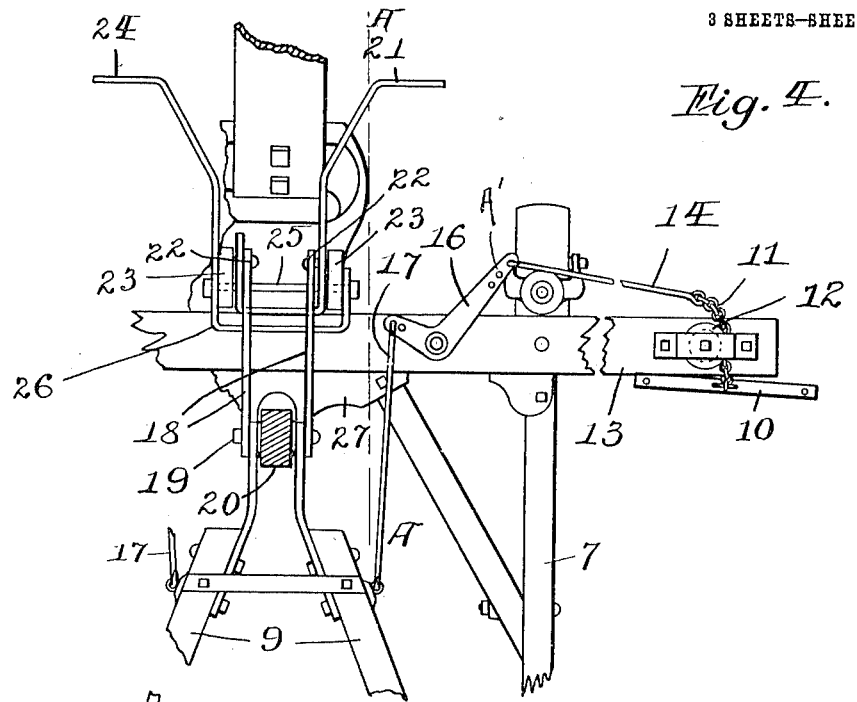

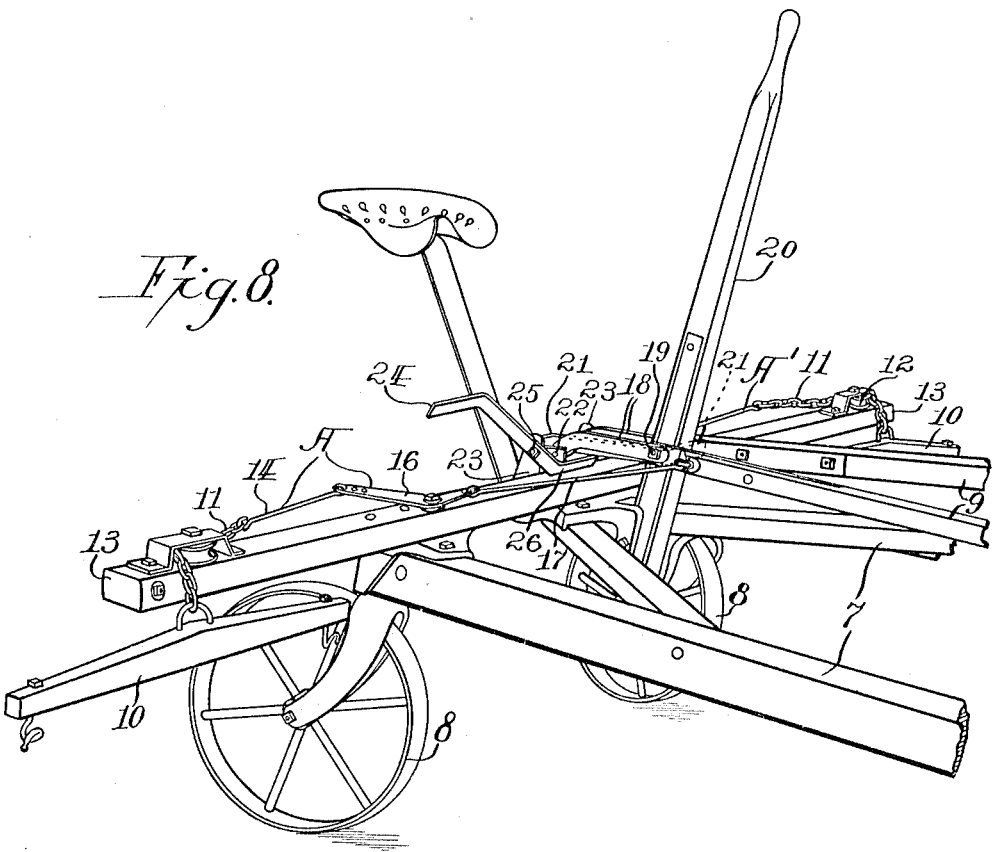
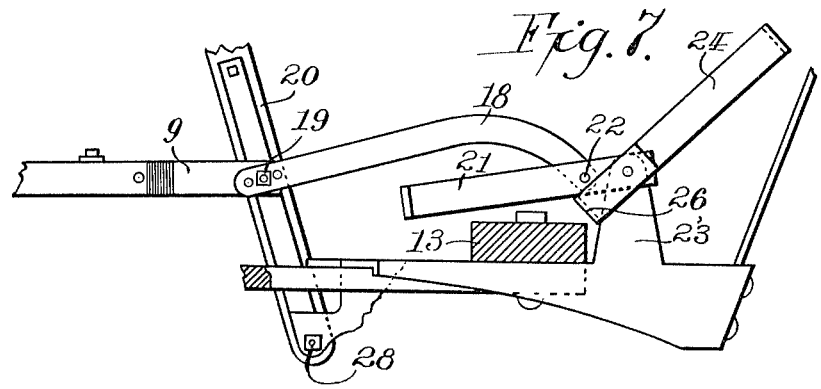

UNITED STATES PATENT OFFICE.

JOHN H. ANDERSON, OF ST. PAUL, MINNESOTA.

PUSH HAY-RAKE.

1,063,938.

Specification of Letters Patent.

Patented June 3, 1913.

Application filed April 12, 1910. Serial No. 554,922.

*To all whom it may concern:*

Be it known that I, JOHN H. ANDERSON, a citizen of the United States, residing at St. Paul, in the county of Ramsey and State of Minnesota, have invented a new and useful Improvement in Push Hay-Rakes, of which the following is a specification.

My invention relates to improvements in push rakes.

My object in this device is to make the operation of the machine lighter and more convenient for the operator. In machines of this class the tilting of the teeth of the rake is ordinarily accomplished by means of a lever manipulated by the man driving the team and it frequently happens that the team cannot be conveniently handled while the driver attends to the raising and lowering of the rake as it takes his entire strength to move the hand operating lever. By the use of my device the rake is positively locked in its raised or lowered position and is consequently adapted to use on uneven ground. The raising of the rake teeth is accomplished by a system of levers connecting to the whiffletrees by which the horses are attached to the machine, and to the rigid frame carrying the rake teeth thus removing the entire load from the operating handle.

Figure 1:
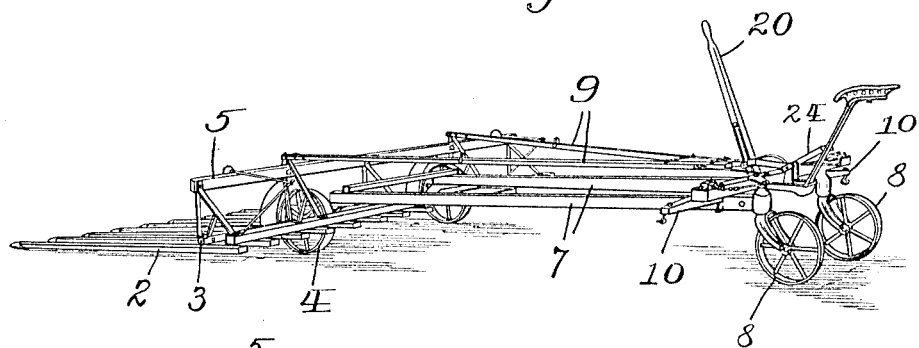
Figure 2:
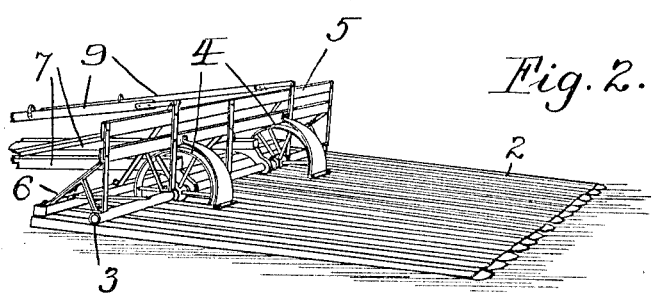
Figure 3:
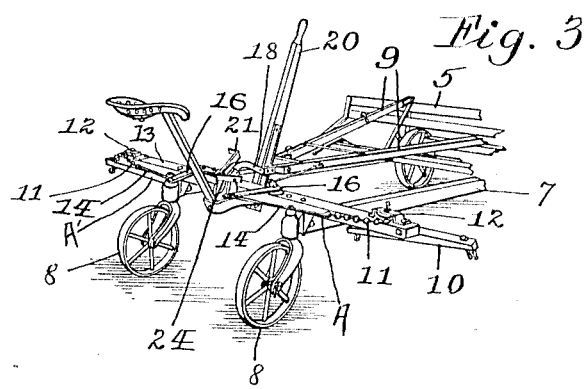

In the accompanying drawings with which I have illustrated my device and forming part of my specification, Figure 1 is a perspective view of a complete push rake; Fig. 2 is a perspective view showing the means of mounting the rake teeth and the attachment of the tilting bars; Fig. 3 illustrates the operator's seat and the connection between the tilting bars and the whiffletrees; Fig. 4 is an enlarged detail of my device; Fig. 5 is a section on the line A—A of Fig. 4 illustrating the locking device with the rake locked in its raised position, and Fig. 6 is a view of the same section illustrating the locking device in an intermediate or unlocked position; Fig. 7 is a similar section showing the locking device in its "locked down" position, and Fig. 8 is an enlarged view of the parts connecting the whiffletrees and the tilting bars.

In these drawings the same numerals are used to indicate identical parts in the different views.

My device is used in connection with a four wheeled push rake having a series of teeth 2 attached to a shaft 3 which is journaled upon wheels 4. Frame 5 is attached to shaft 3 and extends above it forming a stop for the hay as it moves back along the teeth 2, and is rigidly connected by brace 6 to the rear end of the teeth extending back from the shaft 3. Journaled on the shaft 3 are reaches 7 forming a framework, suitably braced, and connected to the tiller wheels 8.

Attached to the top of frame 5, and spaced apart, are two tilting bars 9 which connect with the tilting device A—A' and the operating lever. The tilting device A—A' which is employed for tilting the rake up and allowing it to lower into substantially horizontal position, is double in form, a set of instrumentalities composing each part being arranged upon the cross frame 13 and the two sets being disposed on opposite sides of the locking mechanism and hand operating lever 20. In the following description, similar parts in the two devices will be indicated by similar numerals.

The tilting device which is attached to the whiffletree 10 consists of a chain 11 connecting to the whiffletree and passing around the pulley 12 which is pivotally mounted on the cross frame 13. This chain connects to a rod 14 which operates a bell crank 16 also pivotally mounted on the frame 13. To the other arm of the bell crank 16 is attached the rod 17 connecting to the tilting bars 9 in such a manner that the action of the horse pulling upon chain 11 operates the bell crank and pulls back the tilting bars toward the rear of the machine. This longitudinal movement of the tilting bars transmitted to the frame 5 and the rigidly connected teeth of the rake causes the rake to be rotated about its bearings in wheels 4 and the ends of the teeth 2 are raised from the ground. When the rake is thus raised, it is locked in position and the pull of the whiffletree is communicated to the cross frame 13 and in no way interferes with the pull of the horse on the machine. This is also true when the rake is locked in its lower position. The locking of the tilting device is accomplished by locking bars 18 which are attached by bolt 19 to the tilting bars 9 at the point where they connect to the operating lever 20 and connect to foot lever 21 by bolts 22.

Foot lever 21 is mounted on lugs 23 by means of bolt 25 which also carries the tripping lever 24. When the rake is lifted to its raised position either by means of the hand operating lever 20 or the titlting device described above, the foot lever 21 falls into the position shown in Fig. 5 and foot pressure on the lever forces the bolts 22 forming its connection with the locking bars 18 into a position below bolt 25 which connects the foot lever to the lugs 23, and thus securely locks the tilting bars against any forward motion which would tend to lower the rake. To unlock the rake from this position, it is necessary only to press on the tripping lever 24 as shown in Fig. 5, thereby raising the yoke 26 connected thereto against the locking bars 18 and raising them out of the locking position shown in Fig. 5, the rake can then be lowered by its own weight or a light pressure on the operating handle to its lowest position when the locking bars 18 will assume the position shown in Fig. 6 where foot pressure on the lever 21 forces the bolts 22 again into a position lower than bolt 25 and the tilting bars 9 are securely locked against any backward motion which would tend to raise the rake as shown in Fig. 7. To release the rake from this position the tripping lever 24 is again pressed down raising the yoke 26 against the foot lever 21 as shown in Fig. 7 and lifting the locking bars 18 out of the locking position illustrated in Fig. 7. Thus it is seen that the lever 21 is used in locking the rake in both its raised and lowered positions while the lever 24 is adapted to unlock the rake from both these positions. Both the foot lever and tripping lever are so located as to be convenient to the feet of the operator seated upon the machine and are so proportioned as to be easily manipulated by the operator without interfering with his handling of the team when driving. The hand operating lever 20 is pivotally mounted on plate 27 at 28 which is attached to the cross frame 13 and is adapted to raise and lower the rake when the draft animals are not hitched to it.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. In a locking device for a push rake, tilting bars pivotally connected to said rake, a foot lever, locking bars pivoted on said tilting bars and connected to said foot lever, said lever being adapted to carry the attached ends of the bars in its movement beyond a line connecting the pivot points of the lever and bars in either the raised or lowered position of said rake, thereby locking said rake against movement out of these positions, a tripping lever pivoted at the same point as said foot lever and adapted to engage said foot lever to unlock said rake, and separate means directly connected to said tilting bars to raise and lower said rake.

2. A device of the class set forth, comprising, in combination, a tilting rake, a carrier frame on which said rake is mounted, tilting bars connected to said rake to tilt the latter, locking bars connected to said tilting bars, a foot lever attached to said locking bars and mounted on said frame, said foot lever being adapted to carry said locking bars into locking position, a tripping lever mounted on said frame in position to engage said foot lever to release the locking bars, a bell crank pivoted on said frame and connected at one end by a link to said tilting bars, and a draft attachment connected to the other end of said bell crank; whereby draft may be utilized to operate the tilting bars to raise said rake and said tilting bars may be locked by said foot lever to hold the rake in its raised or lowered position.

3. A device of the class set forth, comprising, in combination, a rake formed of forwardly extending and substantially parallel teeth, supporting wheels, a shaft carried by said wheels and upon which said rake is journaled, a backwardly extending reach frame journaled on said shaft, wheels upon which the rear end of said reach frame is mounted, a cross frame carried by the rear end of said reach frame, tilting bars connected to said rake for tilting the same upon said shaft, a hand operated lever pivoted on said frame and connected to said tilting bars to operate the same, draft means connected to said bars independent of said hand operated lever for operating the same to tilt said rake up, locking bars attached to said tilting bars to lock the same when said rake is in raised or lowered position and a foot lever for tripping said locking bars out of locking position and permitting the action of said draft means to be directly applied to said bars.

4. In an operating device for push rakes, tilting bars attached to said rake, to raise and lower it, a hand operated lever journaled on said rake and connected to said tilting bars to operate the same, power means directly connected with said tilting bars independent of said hand operated lever to raise said rake, locking bars pivoted to said tilting bars and a lever connected with said locking bars adapted to carry said bars into locking position in the raised and lowered positions of said rake.

In testimony whereof, I have signed my name to this specification, in the presence of two subscribing witnesses.

JOHN H. ANDERSON.

Witnesses:
 JOSEPH M. OKOMSKI,
 H. L. FISCHER.